(No Model.)

T. CUBBINS.
CISTERN COVER.

No. 285,801. Patented Oct. 2, 1883.

WITNESSES
F. L. Durand
J. Reed Littell

INVENTOR
Thomas Cubbins
by C. A. Snow & Co.
Attorneys

UNITED STATES PATENT OFFICE.

THOMAS CUBBINS, OF MEMPHIS, TENNESSEE.

CISTERN-COVER.

SPECIFICATION forming part of Letters Patent No. 285,801, dated October 2, 1883.

Application filed February 6, 1883. (No model.)

*To all whom it may concern:*

Be it known that I, THOMAS CUBBINS, a citizen of the United States, residing at Memphis, in the county of Shelby and State of Tennessee, have invented a new and useful Cover for Cisterns, &c., of which the following is a specification, reference being had to the accompanying drawings.

This invention relates to covers for cisterns; and it consists in certain improvements in the construction of the same, which will be hereinafter fully described, and particularly pointed out in the claims.

Figure 1:
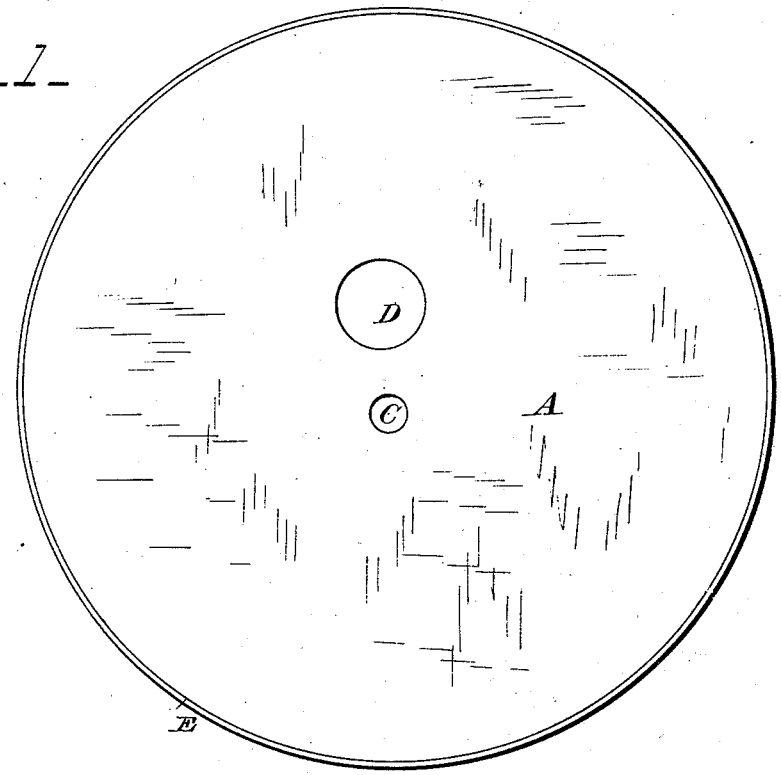
Figure 2:
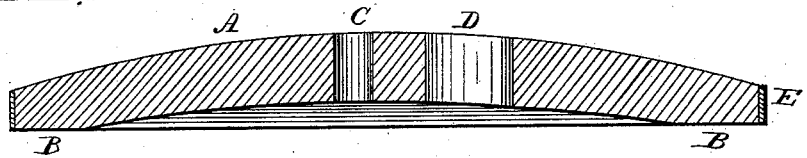
Figure 3:
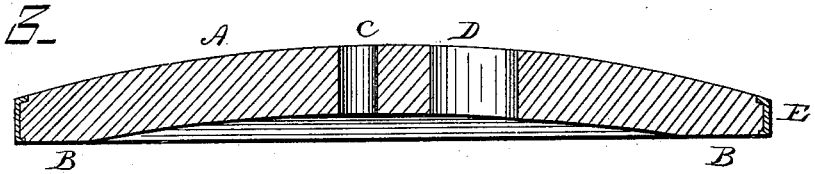
Figure 4:
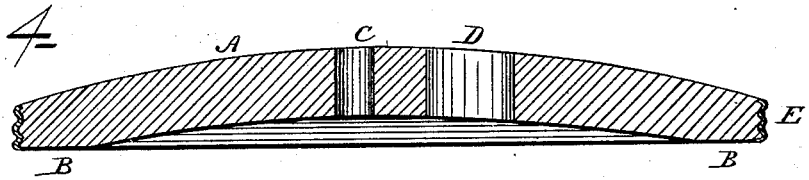

In the drawings hereto annexed, Figure 1 is a top view of my improved cistern-cover. Fig. 2 is a vertical sectional view of the same on the line $x\ x$ in Fig. 1, and Figs. 3 and 4 are vertical sectional views, illustrating modifications in the construction of my improved cistern-cover.

The same letters refer to the same parts in all the figures.

Covers for cisterns have heretofore been made usually of wood, and, in exceptional cases, of stone or metal. The first has always been objectionable on account of its liability to rot and contaminate the water, rendering it unfit and unwholesome for drinking purposes. The covers of stone or metal, while useful, have, on account of their expensiveness, been unattainable for those of limited means. My invention therefore has for its object to provide a simple, convenient, inexpensive, and absolutely sanitary cistern-cover, which shall supply a want long felt in sections of the country where the supply of cistern-water is relied on for household purposes.

A in the drawings represents my improved cistern-cover, which is made or molded of artificial stone, of which any suitable well-known composition may be used, the principal ingredients being Portland cement and sand. This composition, while in a plastic state, is placed in a suitable mold and formed into a plate or disk of the size and shape required. In the drawings, a circular cover has been shown. In order to make the cover sufficiently strong, without adding too much to its weight, I prefer to make it, as shown, concavo-convex or arched, when, without making the cover excessively thick, it will be found, when set or hardened, to be possessed of great strength. The under side of the cover is flattened at the edge, as shown at B, so as to rest securely upon the upper edge of the cistern-curbing. I prefer to make the cover, as shown, of increasing thickness from the edge to the center, at or near which point openings C D are provided, respectively, for the filter and the pump-barrel.

My improved cistern-cover is molded within a band or tire, E, of iron, which serves to give great additional strength thereto. This band may either, as in Fig. 1, be an ordinary plain band, or it may be flanged at its upper and lower edges, as in Fig. 3, or vertically corrugated, as in Fig. 4. The two latter constructions, it will be seen, will serve to prevent the band or tire from slipping off.

I claim as my invention, and desire to secure by Letters Patent of the United States—

1. A cistern-cover consisting of a plate or disk of artificial stone, having a metallic band or tire of irregular form in vertical section, as and for the purpose set forth.

2. A cistern-cover consisting of an arched or concavo-convex disk, of artificial stone, having a metallic band or tire, as set forth.

3. A cistern-cover consisting of a concavo-convex or arched disk, of artificial stone, of increasing thickness from the edge to the center, having openings for the filter and pump-barrel, and inclosed by a metallic band or tire, as set forth.

In testimony that I claim the foregoing as my own I have hereto affixed my signature in presence of two witnesses.

THOMAS CUBBINS.

Witnesses:
 A. H. LONGKASS,
 LUKE W. FINLAY.